United States Patent [19]

Sikes et al.

[11] Patent Number: 4,585,560
[45] Date of Patent: Apr. 29, 1986

[54] INHIBITION OF INORGANIC AND BIOLOGICAL CACO$_3$ DEPOSITION BY A POLYSACCHARIDE FRACTION OBTAINED FROM CACO$_3$-FORMING ORGANISMS

[75] Inventors: C. Steven Sikes, Mobile, Ala.; A. P. Wheeler, Clemson, S.C.

[73] Assignee: University of South Alabama, a Public Body Corporate, Mobile, Ala.

[21] Appl. No.: 563,252

[22] Filed: Dec. 19, 1983

[51] Int. Cl.$^4$ .............................................. C02F 5/10
[52] U.S. Cl. .................................. 210/698; 106/14.15; 134/22.14; 252/180; 422/16
[58] Field of Search ............... 106/14.05, 15.05, 14.15; 210/698; 252/180, 181; 422/16; 134/22.14

[56] References Cited

U.S. PATENT DOCUMENTS

| 391,105 | 10/1888 | Wright et al. | 210/698 |
| 2,264,654 | 12/1941 | Boyd | 252/181 |
| 3,533,940 | 10/1970 | Peniston et al. | 210/728 |
| 3,554,922 | 1/1971 | Berner | 106/14.15 |
| 3,940,258 | 2/1976 | Copes | 106/14.15 |
| 4,534,881 | 8/1985 | Sikes et al. | 252/180 |

FOREIGN PATENT DOCUMENTS 451929  8/1936  United Kingdom ................ 252/181

OTHER PUBLICATIONS

J. Biochem. 129 (1982), "The Role in CaCO$_3$ Crystallization . . . " Borman et al., pp. 179-183.

J. Biochem. 70 (1976), "Isolation and Characterization of a Ca$^{2+}$-Binding . . . ", de Jong et al., pp. 611-621.
Biomin. and Biol. Metal Accumulation (1983), "A Systematic Approach to Some Fundamental . . . " Sikes et al., pp. 285-289.
Biomin. and Biol. Metal Accumulation (1983), "Calcification in Coccolithophorids", de Jong et al., pp. 291-301.
Biomin. and Biol. Metal Accumulation (1983), "Inhibition of CaCO$_3$ Precipitation . . . ", de Jong et al., pp. 303-305.
"Aspects of Calcification in Emiliania . . . ", de Jong et al., pp. 135-153.
J. Biochem. 99 (1979), "Biocalcification by the Marine Alga . . . " de Jong et al., pp. 559-567.

Primary Examiner—Richard V. Fisher
Assistant Examiner—W. Gary Jones
Attorney, Agent, or Firm—Oblon, Fisher, Spivak, McClelland & Maier

[57] ABSTRACT

The present invention relates to a method of inhibiting the formation of CaCO$_3$-containing deposits on a surface, by applying a composition comprising an anti-calcification effective amount of the polysaccharide-containing fraction substantially devoid of proteinaceous material, isolated from a CaCO$_3$-containing tissue obtained from a CaCO$_3$-forming organism. The fractions can be isolated from a variety of CaCO$_3$-containing tissues, including but not limited to algae coccolith and the like. The present method is useful for the prevention and/or retardation of inorganic scaling, as well as, for the inhibition of fouling by plant or animal organisms.

12 Claims, No Drawings

INHIBITION OF INORGANIC AND BIOLOGICAL CACO3 DEPOSITION BY A POLYSACCHARIDE FRACTION OBTAINED FROM CACO3-FORMING ORGANISMS

The work of the present invention was supported in part by a grant from the U.S. Department of Commerce, National Oceanic and Atmospheric Administration.

BACKGROUND OF THE INVENTION

1. Field of the Invention

This invention relates generally to the subject matter of the inorganic and biological calcium carbonate formation. More particularly, it relates to the inhibition of calcium carbonate deposition by a polysaccharide fraction obtained from calcium carbonate-forming organisms. This polysaccharide fraction has been found effective for the inhibition of inorganic or biological $CaCO_3$-deposition on a surface with which it is contacted.

2. Description of the Prior Art

Control of $CaCO_3$-encrustation and growth of calcifying organisms on surfaces in marine environments has long been recognized as a potentially solvable problem. By preventing or slowing the occurrence of these "fouling" substances in organisms, the useful lifetime of surfaces such as hulls of ships and pilings of docks can be increased. In the case of hulls of ships, prevention of fouling also has the effect of allowing the ship to move more efficiently through the water.

Historically, the problem has been approached by impregnating or coating surfaces with compounds that interfere with the metabolism of fouling organisms. For example, the use of inhibitors of carbonic anhydrase, an exzyme often involved in calcification, has been suggested for such use (Costlow, J. D., Physiological Zoology, 32:177 (1959)). More recently, inhibitors of the enzyme polyphenol oxidase, also involved in the calcification process have been shown effective as anti-fouling compounds (Turner, R. D., Symposium on Marine Biodeterioration, Naval Institute Press, Washington, D.C.). Less specific metabolic inhibitors, such as organotin compounds, are also being applied (Good, M. L., Symposium on Marine Biodeterioration, supra).

In addition, $CaCO_3$ crystal growth occurs abiotically in most natural solutions leading to unwanted calcified deposits. For example, scale builds up anywhere in the sea where nucleation occurs, because sea water is supersaturated with respect to $CaCO_3$ by a factor of 5 to 10-fold, allowing crystal growth to proceed spontaneously (Stumm, W. and Morgan, J. J., Aquatic Chemistry, John Wiley and Sons, Somerset, N.J. (1981)). Inorganic scales are also often encountered as unwanted deposits in pipes and boilers where supersaturation becomes a problem due to evaporative concentrations of ions. Carboxylates, such as NTA, ethylene diamine tetraacetate (EDTA) and gluconates have been used to retard or inhibit the precipitation of supersaturated solutions of calcium carbonate, although somewhat high concentrations are needed for these compounds to act as effective inhibitors. Hexametaphosphate, at 1–10 ppm concentration was found to retard scaling leading to the widespread use of polyphosphates as scale inhibitors in municipal and industrial water systems. (Monsanto's Technical Bulletin No. IC/SCS-323, Dequest 2010 Phosphonate).

In recirculating cooling water systems, calcium carbonate is generally the predominant scalant. Since cooling towers are efficient air scrubbers, this circulating water is saturated with $CO_2$, establishing an equilibrium between bicarbonate and carbonate in solution. As the pH of the water rises, this equilibrium shifts towards carbonate. Heating also produces a shift in the dissolved inorganic carbon equilibrium to the right, producing calcium carbonate:

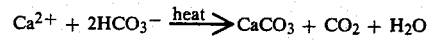

$$Ca^{2+} + 2HCO_3^- \xrightarrow{heat} CaCO_3 + CO_2 + H_2O$$

Finally, calcium carbonate shows an inverse solubility trend, being less soluble at higher temperatures. All of these factors tend to produce scaling on critical heat-transfer surfaces which reduces the heat transfer efficiency, increases frequency of required cleaning and decreases the life of the system. Several of the inhibitors of the precipitation of calcium carbonate show the phonomenon of a threshold effect, e.g., the prevention of precipitation from supersaturated solutions of scalants by substoichiometric levels of inhibitors. Present mechanistic theories postulate that the threshold agent is absorbed on the growth sites of the scalant crystallite during the process of crystallization and alters the growth pattern so that the resultant scalant crystals are formed more slowly and are highly distorted. (Reddy M. M. and Nancollas, G. H., Desalination 12:61 (1973)).

A speculative model of organic matrix structure and function, based primarily on aspects of mollusk shell proteinaceous matrix biochemistry, as well as a brief review of the proteinaceous organic matrices from various other phyla was presented by Weiner, S., Traub, W. and Lowenstam, H. A., "Organic Matrix in Calcified Exoskeltons", in Biomineralization and Biological Metal Accum., pp. 205–224 (1983), Westbroek and De Jong, Eds., Reidel Publishing Co. Further characterization of the various matrical components, such as the soluble matrical fraction containing glycoprotein components can be found in Krampitz, G., Drolshagen, H., Hausle, J., and Hof-Irmscher, K, "Organic Matrices of Mollusk Shell", in Biomineral, and Biol. Metal Accum., supra, pp. 231–247 (1983), incorporated herein by reference. Calcium-binding, sulfated, high molecular weight glycoproteins have been identified in the soluble matrix of several species. In addition, this soluble fraction may also contain a number of smaller molecular weight glycoprotein components (Weiner, S., Lowenstam, H. A. and Hood, L. J., J. Exp. Mar. Biol. Ecol., 30:45–51 (1977), incorporated herein by reference). A further characterization of the amino acid sequence of soluble mollusk shell protein by peptide analysis after cleavage of the proteins on both sides of the Asp residues, showed a pattern of a repeating sequence of aspartic acids separated by either glycine or serine in an alternative manner with Asp. The repeating sequence observed is of the form $(Asp-Y)_n$-type, where Y is a single amino acid. The natural organic matrix of almost all mineralized tissues studied to date (both vertebrates and invertebrates) contain proteins which are enriched in aspartic acid (Asp) and/or glutamic acid (Glu) (Veis, A., and Perry A., Biochemistry 6:2049 (1967)); Shuttleworth, A., and Veis, A., Biochem. Biophys, Acta, 257:414 (1972)).

The $(Asp-Y)_n$-type sequence was hypothesized to be present in the organic matrices from a variety of molluscan species, such as Crassostrea virginicia, Mercenaria mercenaria, Crassostrea irredescens and Nautilus pompiliums, and suggested that these sequences played a function as a template for mineralization, although X-ray diffraction studies showed that there was a poor match between the Ca-Ca distances in the crystal lattice and the potential calcium-binding sites along the polypetide chain for this sequence (Weiner S., and Hood L., Science 19: 987 (1975); Weiner S., in The Chem. and Biol. of Mineral. Connective Tissues, Veis A., ed., pp., 517-521, Elsevier North Holland, Inc. (1981); and Weiner S. and Traub W., in Struct. Asp. of Recog. and Assembly in Biol. Macromolec. Balaban, N., Sussman, J. L., Traub, W. and Yonath, A., Eds., pp. 467-482 (1981), incorporated herein by reference).

Acknowledging that the process of $CaCO_3$ nucleation and crystal growth itself is central to the process of encrustation by all calcifying organisms, such as barnacles, oysters, ship worms, algae and the like, Wheeler, A. P., George, J. W. and Evans, C. A., Science 212: 1397 (1981), incorporated herein by reference, made the discovery that a 170,000 dalton MW glycoprotein obtained from the proteinaceous matrix that permeates the $CaCO_3$ of oyster shell is a very potent inhibitor, rather than an initiator of $CaCO_3$ nucleation and crystal growth as previously throught. The 170,000 glycoprotein was identified by staining for carbohydrates and it was shown to contain 10.2% carbohydrate by weight. The molecular weight and carbohydrate content reported for the glycoprotein from oyster shell are comparable to those observed for the protein obtained from clams by Crenshaw, M. A., Biomineralization 6: 6 (1972), incorporated herein by reference.

Wheeler, A. P., and Sikes, C. S., in concurrently filed and copending application Ser. No. 563,280 entitled "Inhibition of the Formation of Inorganic or Biological $CaCO_3$-Containing Deposits by a Proteinaceous Fraction Obtained from $CaCO_3$-Forming Organisms", incorporated herein by reference, disclose a method of inhibiting the formation of $CaCO_3$-containing deposits with a glycoprotein-containing fraction isolated from $CaCO_3$-containing tissues obtained from $CaCO_3$-forming plants or animals. As such, the glycopeptide-like materials have been shown to have a broad range of MW ranging from 400 to $10^8$, and higher.

Sikes, C. S. and Wheeler, A. P., in concurrently filed and copending application Ser. No. 563,144, now U.S. Pat. No. 4,534,881, entitled "Inhibition of Inorganic or Biological $CaCO_3$ Deposition by Poly Amino Acid Derivatives", incorporated herein by reference, further disclose a method of inhibiting the formation of inorganic or biological $CaCO_3$ deposition by applying a synthetic amino acid polymer having a proteinaceous matrix-like structure.

Sikes, C. S. and Wheeler, A. P., in concurrently filed and copending application Ser. No. 563,145 entitled "inhibition of Inorganic or Biological $CaCO_3$ Deposition by Synthetic Polysaccharide Derivatives", incorporated herein by reference, further disclose a method of inhibiting the formation of inorganic or biological depositions of $CaCO_3$ by applying to a surface in contact with $CaCO_3$ a synthetic saccharide polymer having a polysaccharide matrix-like structure.

None of the cofiled, copendingg applications by the present inventors are considered prior art to the present invention.

Coccolithophoridae are calcareous algae characterized by their ability to form a calcified cell cover consisting of calcite plates called coccoliths. The coccoliths from the species *Emiliania huxleyi* were sown to contain a water-soluble acid polysaccharide possessing $Ca^{+2}$-binding capacity (de Jong, E. W., Bosch, L. and Westbroek, P., Eur. J. Biochem., 70:611-621 (1976)). The polysaccharides were characterized to have a heterogeneous matrix containing uronic acid and having high affinity and low affinity sites for binding of $Ca^{+2}$. (de Jong, E. W., Dam, W., Westbroek, P., and Crenshaw, M. A., in The Mech. of Mineral. in the Invertebrates and Plants, Watabe, N., and Wilbur, K. M., eds., University of S. Carolina Press, Columbia, pp. 135-153 (1976), incorporated herein by reference). The polysaccharide matrix was also shown to contain ester sulphates by incorporation of radioactive sulphated groups (de Jong, E., Van Rens, L., Westbroek, P. and Bosch, L., Eur. J. Biochem. 99:559-567 (1979), incorporated herein by reference).

An interest in further elucidating the role played by the structural parts of the polysaccharide matrix from $CaCO_3$-forming animals in the inhibition of $CaCO_3$ incrustation and growth of calcifying organisms, prompted the present inventors to search for other potent and commercially useful inhibitors of said processes. This successful innovation and perfection, for the first time, of the process for the purification of new polysaccharide fractions substantially devoid of proteinaceous components, from this soluble matrix of $CaCO_3$-forming animal and plants, resulting in a significantly potent calcium carbonate-deposition inhibitor, now opens the possibility of using the animal- or plant-derived polysaccharide fractions for the inhibition of calcium carbonate deposition in pipes, boilers and the like, of widespread use in industrial environments, as well as for the prevention of fouling of surfaces in marine environments. The use of these highly potent polysaccharide inhibitors for the inhibition of $CaCO_3$ deposition has heretofore been unknown in the art.

SUMMARY OF THE INVENTION

The present invention relates to a method of inhibiting the formation of $CaCO_3$-containing deposits on a surface by applying a composition comprising an anti calcification effective amount of a polysaccharide-containing fraction substantially free of protein components, isolated from a $CaCO_3$-containing tissue obtained from a $CaCO_3$-forming organism. Said fractions can be isolated from various $CaCO_3$-containing tissues, including but not limited to, algae coccoliths, and the like. The present method is useful for the prevention and/or retardation of inorganic scaling, as well as, for the inhibition of fouling by plant or animal organisms.

A more complete appreciation of the invention and many of the attendant advantages thereof will be readily perceived as the same becomes better understood by reference to the following detailed description.

DETAILED DESCRIPTION OF THE INVENTION

Sikes, C. S. and Wheeler, A. P., in "A Systematic Approach to Some Fundamental Questions of Carbonate Calcification", in Biomineral, and Biol. Metal Accum., supra, pp. 285-289, incorporated herein by reference, postulated an inhibiting role for phosphate and sulphate groups in the nucleation of $CaCO_3$ crystals.

A polysaccharide-containing soluble matrix containing phosphate and sulfate groups isolated from algae coccolith has been found by the present inventors to have an effect on the rate of precipitation of calcium carbonate as measured by the change in the pH of $CaCO_3$-containing solution. The present invention relates to the inhibition of calcium carbonate deposition by a soluble polysaccharide fraction which is substantially devoid of proteinaceous materials obtained from calcium carbonate-forming organisms. As such, the present invention relates to a method of inhibiting $CaCO_3$ deposition by soluble polysaccharide-containing fractions having MW about $1,000K-10^8K$, and even higher. Both the low and high MW fractions have substantial inhibitory activity of the formation of $CaCO_3$ and are thus useful as anti-scaling, as well as anti-fouling agents.

The prevention of $CaCO_3$ formation by organisms (fouling) such as barnacles, molluscs, sea urchins and calcareous algae, among others, is a very different problem than the prevention of inorganic $CaCO_3$ scaling. The biological formation of $CaCO_3$ is a complex process intimately associated with the metabolism of the organism. The forming crystals are normally insulated from the external environment by several membranous or cellular layers. These layers represent a potential barrier that could prevent an inhibitor of $CaCO_3$ crystal formation, particularly macromolecular ones, from reaching the site of crystal growth. However, the polysaccharide-containing soluble matrix appears to be effective in controlling calcification by both plants and animals.

The polysaccharide-like materials contained in the soluble fraction are significantly stable structures which do not appear to be biodegraded or deactivated through catabolism. The polysaccharide-containing materials differ from the inhibitors disclosed in co-filed and copending U.S. Application by the same inventors, above, in that while the inhibitory material in said Application are of a proteinaceous nature and contain a small percentage of carbohydrate components, the present inhibitors by a $CaCO_3$ deposition are mainly formed by a monosaccharide backbone and are substantially lacking in a proteinaceous component. The evidence suggest that the inhibitory potencies of the different MW preparations of the polysaccharide-containing soluble matrix are preserved for up to several hours without being metabolically degraded. The present inhibitors are stable and maintain their $CaCO_3$-forming inhibitory activity in vitro at room temperature for over 100 hours, and even longer periods of time. In addition, all MW polysaccharide fractions can resist a treatment with moderate amounts of pressure (18 psi) while preserving their characteristics and activities. The MW fractions of this invention possess high stability and undiminished inhibitory activities of $CaCO_3$ formation when kept under refrigeration for periods of up to a year and longer.

The preparation of the soluble polysaccharide matrix of this invention can be accomplished by a variety of known methods. One of the preferred methods of preparing the various MW polysaccharide-containing soluble matrices from $CaCO_3$-forming microorganisms will be described herein. This method is based on that of de Jong, E. W., Bosch, L., and Westbroek, P., Eur. J. Biochem., supra, incorporated herein by reference. Briefly, the plants or animals may be obtained fresh, shucked, the $CaCO_3$-containing tissues cleaned overnight with, e.g., 5% sodium hypochlorite to remove and solubilize organic material leaving the $CaCO_3$ coccoliths as a solid residue. The $CaCO_3$-containing tissues may be ground with, e.g., a mortar and pestle or with a hammer mill to pass through a mesh screen, e.g., a 1 mm mesh screen. Alternatively, the coccolith fraction may be collected by centrifugation, e.g., at low accelerations such as $1,000 \times g$ for 5 minutes, although other conditions may also be utilized. Ground $CaCO_3$-containing tissues may be dialyzed against, e.g., 10% (w/v) EDTA, pH 8.0, using a dialysis membrane having a 10,000-15,000 cut-off MW to define separate compartments. Other concentrations of EDTA, pH's or cut-off MW dialysis membranes can also be used according to the needs. Some of the different conditions which may be used are dissolution with organic, as well as inorganic acids, such as acetic, hydrochloric or sulfuric acid or other acids, or dissolution with chelating agents, such as $Ca^{++}$-chelating agents, or by directly stirring coccolith material in any dissolution media. This step can also be practiced with agitation, either manual or mechanical to ensure the stirring of the solution. Preferred concentrations for $Ca^{++}$-chelating agents are 0.001-30% (w/v) and for weak organic acids, 0.001-20% (v/v), although lower or higher concentrations can also be used if the pH of the solution is maintained at about 1-5. Inorganic acids are preferably used in concentrations which preserve the pH of the solution at about 1-5, as well. The dialysis membrane can also be in the form of a bag surrounded by the dialysis solution for small scale preparations.

The thus dialyzed preparation can be centrifuged to separate the soluble components from insoluble materials. However, any method to separate the supernate from insoluble debris can be utilized. If the preparation is centrifuged, this is preferrably carried out in various stages. Large size debris can be removed by filtration or centrifugation at low accelerations. Preferred accelerations for this centrifugation are $100-1000 \times g$. Further centrifugation steps may be added using ever increasing centrifugal accelerations, of up to about $30,000 \times g$ for an appropriate length of time to remove the insoluble matrix (I.M.). In general, approximately 20 minutes of centrifugation appear to be sufficient to remove the insoluble matrix from this preparation, although longer centrifugation times can be used.

The IM itself, can be treated with any base, e.g., NaOH, in order to liberate soluble polysaccharide materials which are highly active in the inhibition of $CaCO_3$ crystal growth in concentrations equivalent to those of the soluble polysaccharide matrix itself.

The supernatant may be further dialyzed exhaustively for an appropriate length of time, preferably with a number of changes of the external solution. Preferred conditions are those where the preparation is dialyzed against deionized and distilled water for several days. If EDTA was included in the dissolution media, at least one dialysis step against a neutral buffer of at least 10 mM ionic strength may aid in the thorough removal of the chelant. Any method of dialysis may be used herein. Preferred are conventional or continuous flow ultrafiltration. The dialysate can be concentrated by, e.g., ultrafiltration, although other methods can also be used e.g., lyophilization, flash evaporation, or osmosis. Any size MW filter can be used for the ultrafiltration step. However, some of the filters preferred are 10K-100K MW filters of the type which can be obtained from Amicon, Spectrapor. The dialysate is preferrably concentrated using an Amicon PM-10-type filter, although other similar filters are also contemplated. The concentrate maybe further applied on a Biogel P4-type column and eluted with, e.g., 10 mM NaCl, although other substrates are also contemplated herein. The fraction collected from the volume may be further concentrated on an Amicon PM-10 filter, dialyzed against distilled water and lyophilized. The insoluble polysaccharide material (IM) obtained after decalcification may be further washed with distilled water and lyophilized. The retentate from the ultrafiltration step, may be further fractionated by any known method which permits the isolation of different MW polysaccharide fractions. One method of fractionation can be implemented by using Sephacryl S-300-type substrates (Pharmacia, Upsala) and the different fractions may be collected separately, although other similar substrates are also contemplated herein. Separate fractions can be further pooled in order to obtain separate preparations having specific MW polysaccharide-containing materials. Thus, all fractions containing polysaccharide-like components having up to 100 million dalton MW can be pooled and utilized as such.

Other methods of producing compositions suitable for use in the present invention have been described in a series of articles published on Jan. 5, 1983, after the development of the present invention. As such, Coccolithophorids have been studied as a suitable model for understanding the mechanisms of biomineralization (de Jong, E. W, Van der Wal, P., Borman, A. H., de Vrind, J. P. M., Van Emburg, P., Westbroek, P., and Bosch, L., "Calcification in Coccolithophorids," in Biomineralization and Biological Metal Accumulation, supra, pp. 291–301, (1983) incorporated herein by reference. The primary structure of the polysaccharide matrix is of a remarkable complexity. It contains a mean repeating unit containing at least 14 different monosaccharides, such as mannose (Man), xylose (Xyl), rhamnose (Rha), galactose (Gal), ribose (Rib), arabinose (Ara), and the like. Several monosaccharides contain one or more methyl groups instead of the more common hydroxy groups of the sugar moieties. These alkyl substituted sugars comprise somewhat hydrophobic regions in the polysaccharide molecule. Some of the monosaccharides have never been found before to be constituents of naturally occurring polysaccharides. Given the complexity of the polysaccharide molecule, it has been speculated that it must fulfill an important role in coccolith formation (de Jong, E. W. et al, in Biomineral. and Biol. Metal Accum., supra; Borman, A. H., de Jong, E. W., Huizinga, M., and Westbroek, P., "Inhibition of $CaCO_3$-Precipitation by a Polysaccharide Associated with Coccoliths of *Emiliania Huxleyi*", in Biomineralization and Biological Metal Accumulation, supra, pp. 303–305, incorporated herein by reference).

de Jong et al, in Biomineral. and Biol. Accum., supra, speculate that the polysaccharide plays a regulatory role in the nucleation, growth and/or termination of calcite crystallization.

Fractions containing $500-10^8 K$ daltons are preferred for inhibiting the deposition of calcium carbonate. Further preferred fractions are those having $10^4-10^7$ dalton MW polysaccharide materials. Further yet, polysaccharide-containing fractions having narrower MW ranges, are also preferred. Some examples of these are: $10^5-10^6$, $1,000-10^5$ and $10^5-10^8$ MW, and smaller MW, e.g., 500-20K, 10K-20K, or 2K-10K, are particularly preferred. Also preferred are fractions containing $10^6-10^7$, $10^4-10^5$ MW, among others.

The smaller molecular weight fractions (500-20K) may be prepared by further hydrolysis of the polysaccharide-containing fractions, with 0.001 to 10N base, such as NaOH, KOH, or $NH_4OH$, or 0.01 to 10N acids, such as HCl, $H_2SO_4$, formic, acetic, or other organic acids, although any base or acid within the cited concentrations can also be used. Other types of hydrolysis are also useful for the preparation of the smaller MW polysaccharide-like fractions, e.g., enzymatic hydrolysis may also be used. These hydrolyses are preferably performed at temperatures ranging from 5° to 110° C. from 5 minutes to 120 hours, although they can be carried out at other temperatures and for different periods of time.

The polysaccharide-containing fractions can be further purified by known methods of polysaccharide purification, although the unpurified fractions may also be used without further purification. One of the preferred methods for further purification of the polysaccharide-containing fractions is that of ion exchange chromatography. Elution of the polysaccharide material may be accomplished by step-increasing the ionic strength of the eluent or by eluting with a continuous ionic strength gradient. Other methods of fractionation may be useful in obtaining higher activity fractions, e.g., high performance liquid chromatography, electrophoresis, and centrifugation, among others.

The filtrate from the ultrafiltration step may be further concentrated on, e.g., QAE-cellulose, and eluted with various salts, e.g., NaCl. The thus eluted fractions may be further dialyzed and further purified by ion exchange chromatography or other chromatographies. The different MW polysaccharide fractions can be isolated from the solubilized polysaccharide materials (including the materials obtained from the IM) by art known methods of gel filtration, among others. As such, the various MW polysaccharide fractions can be separated from the remaining materials, including other MW polysaccharide fractions, proteineous materials, and the like, if so desired. Upon hydrolysis by known methods, such as acidic, basic or enzymatic hydrolyses polysaccharide-containing fractions of lower MW can be obtained.

All fractions tested were found to be active as inhibitors of the formation of $CaCO_3$. The inhibitory potency of the whole soluble polysaccharide-containing matrix is shown in Table 1 in the examples. Also shown therein are data for other active polysaccharides such as pectin and alginate, as well as for inactive polysaccharides.

The present polysaccharide-containing inhibitors obtained at different stages of the above-described preparation method, may be utilized directly without additives or carriers for inhibiting the deposition of $CaCO_3$, whether of inorganic or biological origin. Alternatively, the various MW polysaccharide-containing soluble fractions obtained from calcium carbonate-forming organisms may be utilized by adding an effective amount of the inhibitor fraction to a liquid in contact with a surface on which the deposits may form. Such is the case of industrially useful and commercially important containers, e.g., boilers, piping, desalinators, cooling towers, and the like. The various polysaccharide-containing soluble fractions of this invention can be added to water, water-containing, or other liquids in an amount as small as 0.1 ng/ml. The upper limit for the amount of the polysaccharide fractions is only given by their solubility in the liquid to which they are added. However, if the presence of insoluble polysaccharide-containing residues of these fractions does not interfere with industrial operations, it may be desirable to add these inhibitors in an amount greater than that given by their solubility limit. A preferred range of the various polysaccharide-containing fractions for controlling inorganic $CaCO_3$ scaling is $10^{-4}$–$10^2$ μg/ml. Other preferred ranges are $10^{-4}$–0.1 and 0.1–$10^2$ μg/ml of the various polysaccharide-containing fractions.

When the present inhibitors are utilized for their antifouling characteristics in order to prevent the encrustation of plant or animal organisms, they can be added to a liquid, such as water, water-containing or other non-aqueous liquids, preferably in an amount about 0.001–1,000 μg/ml although larger amounts can also be used. Used within this range of concentrations, the present inhibitors find an application in the prevention of encrustration of organisms in, e.g., running water piping or sewage piping, among others. The present inhibitors can also be applied directly to a surface before it becomes in contact with $CaCO_3$-containing liquids, e.g., industrial containers, marine surfaces, such as those in piers, ships, and the like. The present inhibitors may be applied by themselves or in combination with other salt deposition inhibitors, anti rust agents, or the like and/or with a carrier directly to the exposed surface, or they may be mixed with polymers used for the protection of said surfaces. A variety of carriers are contemplated for the application of the present inhibitors. Some of the most common carriers include aqueous and non-aqueous liquids, gels, oils, organic and inorganic solvents, compressed gases, and the like. However, any carrier may be used according to the needs. When used in high concentrations by themselves, the peptide and protein-containing inhibitors of this invention may be highly viscous and can be easily applied to a surface. After the application of the inhibitor, an appropriate length of time may be allowed for the penetration of the inhibitor into the surface, as is the case with porous surface materials such as wood, ceramics, and the like. Thus, a large storage of the present inhibitors is created within the material, and the surface may then be sealed with a polymer. Alternatively, fractions obtained from either the soluble polysaccharide matrix or the insoluble matrix (IM) may be mixed with a carrier to form a suspension which can be applied to a surface. The present inhibitors may be applied to any type of surface which may be exposed to the formation of inorganic or biological $CaCO_3$ deposits. Some of the most common materials to which the present inhibitors may be applied are metals, woods, synthetic polymers and copolymers, glass, ceramics, painted and otherwise coated surfaces, although other materials are also contemplated. When placed in contact with the $CaCO_3$-containing liquid, the inhibitors will slowly leak out from underneath the polymer layer. The present inhibitors may further be applied in admixture with the polymer, e.g., paints or any synthetic polymer used for the protection of surfaces. When the present inhibitors are used in admixture with a polymer, they can be used in a concentration of between 0.001–90% by weight, although higher and lower concentrations are also contemplated in this invention. Some of the preferred concentrations are 1–75% by weight. Other preferred concentrations are 5–25%, 25–50% and 10–40% by weight.

When applied to a surface, the present inhibitors may be formulated as a powder, solution, suspension, gel, oil, aerosol, paste or viscous colloid, although other formulations are also contemplated herein.

Having generally described the invention, a more complete understanding can be obtained by reference to the Examples which are provided herein for purposes of illustration only, and are not intended to be limiting unless otherwise specified.

EXAMPLES

Preparation of Polysaccharide Soluble Matrix from Calcareous Algae

Calcified cells of *Hymenomonas carterae* were grown by the method Sikes C. S., Roer, R. D. and Wilbur, K. M., Limnol. Oceanogr. 25: 248–61 (1980), and calcified *Coccolithus huxleyi* were grown by the method of, incorporated herein by reference. Briefly, calcified cells were grown in defined medium and harvested by centrifugation at low acceleration, such as $1,000 \times g$ for 5 minutes. The cells were then resuspended in 10 ml of 5.25% sodium hypochlorite overnight to remove the insolubilized organic material and obtained a $CaCO_3$ coccolith as a solid residue. The thus obtained coccolith fraction was collected by centrifugation, as above. The coccoliths were placed in 12–14,000 MW cutoff dialysis tubing and the dialysis medium was agitated at 20°–25° C. using a motor driven cam so that the solution inside the bag was stirred. For EDTA preparations, the dialysis medium was 10% w/v EDTA, pH 8.0.

Following coccolith dissolution, the contents of the dialysis bag are centrifuged in two stages to remove the insoluble matrix (IM): the first utilizing a low force spin and second at $30,000 \times g$ for 20 min.

Exhaustive dialysis of the supernatant containing the soluble polysaccharide fraction at 4° C., follows the centrifugation step. For the EDTA preparations, one dialysis step against 1 mM EDTA is usually included.

The EDTA extract of coccolith soluble matrix prepared as above, yielded about 1 mg of polysaccharide soluble matrix per 3 liters of mature cultures. The coccolith soluble fraction is a sulfated polysaccharide material. The amount of coccolith polysaccharide soluble material in the extract was measured according to Dische, Z., J. Biol. Chem. 167: 189–198 (1947); Dische, Z., in Methods of Biochem. Anal. (2): 313–358, Glick, C. D., Ed., Interscience Press, NY (1955); and Dische, Z. and Shettles, L. B., J. Biol. Chem. 175: 595–603 (1948), incorporated herein by reference. The amount of coccolith polysaccharide soluble matrix in the extract is expressed as the amount of total carbohydrate per volume of extract (Table 1). The soluble polysaccharide fraction obtained from these algae coccolith all had a protein content similar to controls without protein, when determined by the known method of Lowry, D. H., Rosebrough, N. J., Farr, A. L., and Randall, R. S., J. Biol. Chem. 193: 265 (1951), incorporated herein by reference, using bovine serum albumin (BSA, Sigma) as a standard.

CaCO3 Crystallization Studies: Potency of Natural Soluble Matrices and Their Analogs pH-Drift Assays 1. pH 9.5 Assay Inhibitory compounds were added to 30 ml of a synthetic sea water (500 mM NaCl, 10 mM KCl) containing Ca at 30 mM and dissolved inorganic carbon (DIC) at 2 mM. The pH of the solution was adjusted to 9.5 by titration with 1.0N NaOH. Crystals of $CaCO_3$ began to grow spontaneously in the absence of inhibitors after a characteristic induction period (lag phase) during which the solution is stable. Upon initiation of crystal growth at the end of the lag phase, the pH of the solution begins to drop as a result of equilibrium shifts that accompany removal of $CO_3^{2-}$ ions from solution. The rate of crystal growth was monitored by recording the decrease in pH per unit time. Potencies of inhibitors were compared according to their effect on duration of the lag phase prior to crystal growth and their effect on rate of crystal growth at intermediate concentrations of inhibitors.

pH 8.3 Assay

The same conditions as described above were used in this assay except that the synthetic sea water contained 10 mM Ca and 10 mM DIC, and the starting pH was 8.3. At concentrations of the inhibitors that result in partial inhibition, both the rate and total amount of crystal growth was decreased relative to controls in which no inhibitor was added. The results in Table 1 show the potencies for the inhibition of $CaCO_3$ formation of a variety of preparations as measured by pH-drift assays.

Having now fully described the invention, it will be apparent to one of ordinary skill in the art that many changes and modifications can be made thereto, without departing from the spirit or scope of the invention as set forth herein.

What is claimed as new and desired to be secured by Letters Patent of the United States is:

1. A method of inhibiting the formation of $CaCO_3$-containing deposits on a surface, comprising applying to said surface a composition comprising $10^{-4}$ μg/ml–1,000 μg/ml of a polysaccharide-containing fraction substantially devoid of proteinaceous material, isolated from a $CaCO_3$-containing tissue obtained from a $CaCO_3$-forming organism;

wherein the polysaccharide-containing fraction is obtained from the $CaCO_3$-containing tissue by a method comprising the step of placing said tissue in contact with an aqueous solution selected from the group consisting of 0.001–30 g/100 ml of solution of a calcium chelating agent, 0.001–20 g/100 ml or ml/100 ml of solution of a weak organic acid or an inorganic acid wherein the pH of said solution is

TABLE 1

INHIBITION OF $CaCO_3$ FORMATION BY SOME NATURAL AND SYNTHETIC COMPOUNDS

| Compound | Type | Initial pH of Assay | Duration of Lag Phase Prior to Crystal Growth | Inhibitor Concentration μg/ml |
|---|---|---|---|---|
| None | Control | 9.5 | 6.46 min ± 2.11* (n = 30)** | Zero |
| None | Control | 8.3 | 6.11 min ± 4.05* (n = 25) | Zero |
| Oyster Shell Soluble Matrix | Glycoprotein | 9.5 | Indefinite*** (n = 20) | 1.20 |
| Oyster Shell Soluble Matrix | " | 8.3 | Indefinite (n = 10) | 0.10 |
| Oyster Shell Soluble Matrix, Peak 3 | Glycoprotein Fraction | 8.3 | Indefinite (n = 10) | 0.080 |
| Coccolith Soluble Matrix | Sulfated Polysaccharide | 9.5 | Indefinite (n = 3) | 1.2 |
| Sea Urchin Skeleton Soluble Matrix | Proteinaceous | 8.3 | Indefinite (n = 3) | 0.60 |
| Polyaspartate (MW 20K) | Carboxypoly-peptide | 9.5 | Indefinite (n = 20) | 1.2 |
| Polyaspartate (MW 20K) | Carboxypoly-peptide | 8.3 | Indefinite (n = 10) | 0.027 |
| Polyasparagine (MW 10K) | Amine form of Polyasparate | 8.3 | Indefinite (n = 3) | 1.0 |
| Polyglutamate (MW 70K) | Carboxypoly-peptide | 9.5 | Indefinite (n = 10) | 1.4 |
| Polyglutamate (MW 70K), (MW 20K) | Carboxypoly-peptide | 9.5 | Indefinite (n = 10) | 10.0 |
| Poly Glu-Tyr (MW 40K) | Polypeptide, Random Copolymer | 9.5 | Indefinite (n = 10) | 3.5 |
| Poly Glu-Ala-Tyr (MW 40K) | Polypeptide, Random Copolymer | 9.5 | Indefinite (n = 6) | 5.0 |
| Poly Glu-Lys (1 Gly: 4 Lys) | Polypeptide, Random Copolymer | 9.5 | Same as Control, (n = 3) | 20.0 |
| Pectin | Carboxypoly-saccharide | 8.3 | 86 min (n = 3) | 1.8 |
| Alginate | Carboxypoly-saccharide | 8.3 | Indefinite (n = 20) | 7.2 |
| Polygalacturonate | Carboxypoly-saccharide | 8.3 | Same as Control, (n = 3) | 10.0 |
| Carageenans, Types 3,4,5 | Sulfated Poly-saccharides | 8.3 | " | 1.8 |
| Heparin, Chondroitins A,C | Sulfated Poly-saccharides | 8.3 | " | 20.0 |
| Neutral, Polyamino Acids | Polypeptides | 9.5 | " | 20.0 |
| Positive Polyamino Acids | " | 9.5 | " | 20.0 |
| Free Amino Acids, All Types | Monomers | 9.5 | " | 20.0 |
| Polyacrylate (MW 70K) | Carboxypolymer (Industrial) | 9.5 | Indefinite (n = 3) | 10.0 |
| HEDP (MW 208) | Phosphonate (Industrial) | 8.3 | Indefinite (n = 6) | 0.06 |

*Standard Deviation
**Number of Replicate Experiments
***Experiment run for at least 3 hours, at most 120 hours; concentrations less than these amounts result in finite lag phases.

maintained at about 1–5 during the isolation of said fraction, for an appropriate length of time.

2. The method of claim 1 wherein the polysaccharide-containing fraction has a MW of between $500-10^8$ dalton.

3. The method of claim 2 wherein the polysaccharide-containing fraction has a MW of about $10^4-10^7$ dalton.

4. The method of claim 3 wherein the polysaccharide-containing fraction has a MW of about $10^5-10^6$ dalton.

5. The metod of claim 1 wherein the polysaccharide-containing fraction has a MW of about 1,000–100,000 dalton.

6. The method of claim 1, wherein about 0.001–1,000 µg/ml of the polysaccharide-containing fraction are added to said liquid.

7. The method of claim 1, further comprising, treating said polysaccharide-containing fraction with a 0.001–10N aqueous solution of an inorganic base, a weak organic acid or an inorganic acid.

8. The method of claim 1, wherein the surface to which the polysaccharide-containing fraction is applied, is made of a material selected from the group consisting of wood, glass, ceramic, metal, synthetic polymers and copolymers and painted or otherwise coated surfaces.

9. The method of claim 1 wherein said polysaccharide-containing fraction is applied in admixture with a carrier in the form of a powder, solution, suspension, gel, oil, aerosol, paste or viscous colloid.

10. The method of claim 1, wherein the calcium carbonate-containing deposit comprises a calcium carbonate-forming organism.

11. The method of claim 10, wherein 0.001%–90% by weight of the composition of the polysaccharide-containing fraction is applied to said surface.

12. The method of claim 9, wherein the carrier is a paint.

* * * * *

UNITED STATES PATENT AND TRADEMARK OFFICE
CERTIFICATE OF CORRECTION

PATENT NO. : 4,585,560

DATED : APRIL 29, 1986

INVENTOR(S) : SIKES, WHEELER

It is certified that error appears in the above-identified patent and that said Letters Patent is hereby corrected as shown below:

On title page under Other Publications, in first column, line 1, delete "J. Biochem." and insert --Eur. J. Biochem--;

On title page under Other Publications, in second column, line 1, delete "J. Biochem." and insert --Eur. J. Biochem--;

On title page under Other Publications, in second column, line 14, delete "J. Biochem." and insert --Eur. J. Biochem--;

In Column 2, line 25, delete "absorbed" and insert --adsorbed--;

In Column 3, line 2, delete "piliums" and insert --pilius--;

In Column 3, line 63, delete "copendingg" and insert --copending--;

In Column 5, line 40, delete "suggest" and insert --suggests--;

UNITED STATES PATENT AND TRADEMARK OFFICE
CERTIFICATE OF CORRECTION

PATENT NO. : 4,585,560
DATED : APRIL 29, 1986
INVENTOR(S) : SIKES, WHEELER

It is certified that error appears in the above-identified patent and that said Letters Patent is hereby corrected as shown below:

In Column 8, line 35, delete "proteineous" and insert --proteinaceous--;

In Column 10, line 6, delete "method" and insert --method of--;

In Column 10, line 11, delete "method of in" and insert --the method of Sikes, C.S. and Wilbur, K.M., J. Phycol--.

Signed and Sealed this

Twenty-fifth Day of November, 1986

Attest:

DONALD J. QUIGG

Attesting Officer

Commissioner of Patents and Trademarks